United States Patent [19]

Fisher et al.

[11] 4,178,553

[45] Dec. 11, 1979

[54] SAMPLING MODULATED WAVES

[76] Inventors: Charles B. Fisher, 2850 Hill Park Rd., Montreal, Quebec, Canada, H3H 1T1; Sidney T. Fisher, 53 Morrison, Montreal, Quebec, Canada, H3P 3C6

[21] Appl. No.: 964,832

[22] Filed: Nov. 30, 1978

[51] Int. Cl.² ........................................... H04B 1/16
[52] U.S. Cl. .................................. 325/487; 329/50
[58] Field of Search .......... 179/15 A, 15 BC, 15 BW, 179/15 AN, 1 GS, 1 GB; 325/473, 477, 479, 480, 472, 487; 340/347 M; 329/50

[56] References Cited
PUBLICATIONS

"Reference Data for Radio Engineering", New York, 1969, pp. 21-14 and 21-15.

Black, "Modulation Theory", Princeton, 1953, pp. 37-57.
Panter, "Modulation, Noise, and Spectral Analysis", New York, 1965, pp. 506-547.

*Primary Examiner*—Douglas W. Olms

[57] ABSTRACT

The method of transmission of a carrier double-sideband amplitude-modulated by a message, comprising sampling the modulated wave at regular intervals at a sampling rate greater than twice but less than four times the highest message frequency, with the sampling rate an integral sub-multiple of twice the carrier frequency of the modulated wave, the instants of sampling not occurring at instants of zero crossings of the carrier, and subsequent reconstruction of the modulated wave or the message from the sequence of samples in an integrating filter, with substantially complete accuracy.

9 Claims, 3 Drawing Figures

SAMPLING MODULATED WAVES

BACKGROUND OF THE INVENTION

The well-known sampling theorems of information theory are summarized in "Reference Data for Radio Engineers", fifth edition, New York 1969, pages 21-14 and 21-15, and are given in detail in H. S. Black, "Modulation Theory", Princeton 1953, pages 37 to 57 inclusive, and in P. F. Panter, "Modulation, Noise, and Spectral Analysis", New York 1965, pages 506 to 547 inclusive. We do not know of any relevant patent art, publications or apparatus, the theory of which is not fully disclosed in the above references.

These references state that 2B is the lowest sampling rate permissible for transmission and accurate reconstruction of a signal with a bandwidth B, whether the signal extends from zero to B, or from nB to (n+1) B, where n is an integer (see Black at the second paragraph of page 37 and the first paragraph of page 38; see Panter at page 507, the second and third paragraphs).

BRIEF SUMMARY AND OBJECTS OF THE INVENTION

This invention discloses a method of transmission of a carrier double-sideband amplitude-modulated (DSBAM) by a message, which comprises sampling the modulated wave at a rate greater than twice, and less than four times the highest frequency of the message, with the sampling frequency an integral submultiple of twice the carrier frequency and the instants of sampling not coinciding with zero crossings of the carrier. The sequence of samples so obtained as modified by amplification, quantization, modulation, demodulation, or otherwise as required, is transmitted to a filter where the samples are integrated. When a low-pass filter, with a cut-off frequency above the highest message frequency and below the sampling frequency, is used for integration of the sequence of samples, the modulated wave is reconstituted substantially as the message. When a band-pass filter, with a pass band centered on an integral multiple of the sampling frequency, greater than twice the highest message frequency and less than twice the sampling frequency, is used for integration of the sequence of samples, the modulated wave is reconstructed as a DSBAM wave, with a carrier at the integral multiple of the sampling frequency centered on the integrating filter when a band-pass filter is used with a pass band greater than the highest message frequency and less than the sampling frequency, with the upper edge of the pass band just below, or the lower edge just above, one of the integral multiples of the field structure, the message is reconstructed as a single sideband.

The object of the invention is to reduce by a factor of two the sampling frequency used in a sampling means which transmits DSBAM waves.

LIST OF DRAWINGS

The invention may be better understood by reference to the following drawings;

FIG. 1. Block schematic diagram of a DSBAM multiplex transmitting terminal.

FIG. 2. Block schematic diagram of a DSBAM multiplex receiving terminal, according to this invention.

FIG. 3. Block schematic diagram of an amplifier for DSBAM waves, according to this invention.

DETAILED DESCRIPTION OF THE INVENTION

Figure 1:
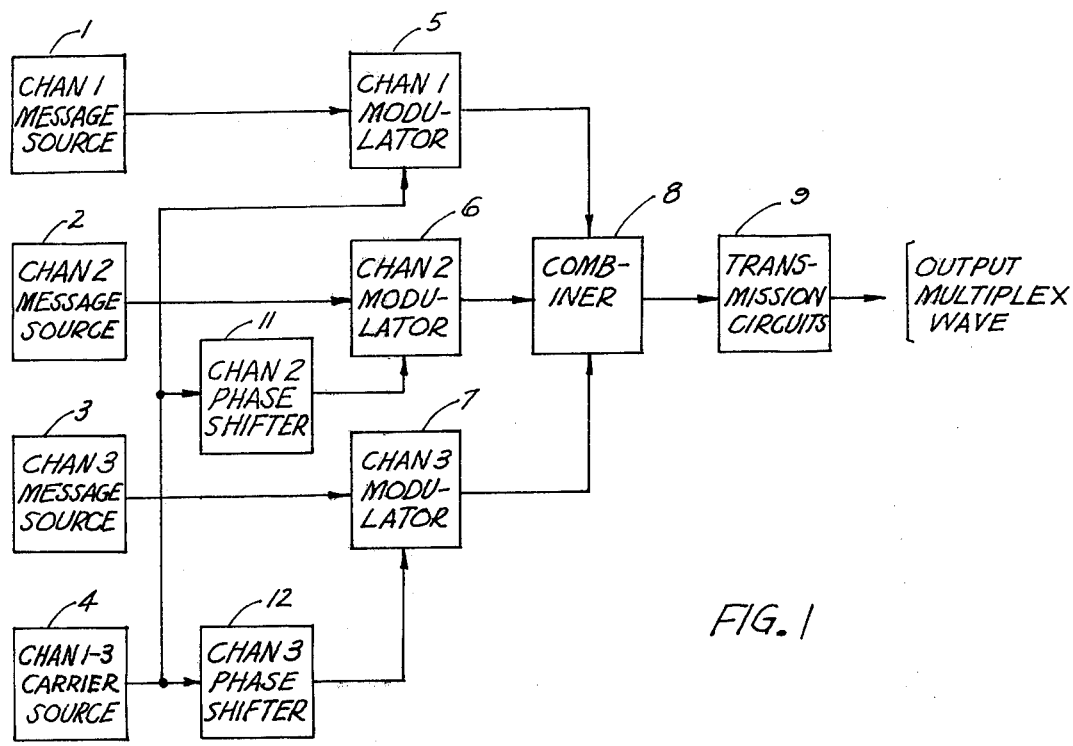

A DSBAM wave has the well-known property that the positive envelope and the negative envelope of the wave are identical except reversed in polarity, and with a distortionless modulator are identical in waveform with the message which is the modulating wave. This invention makes use of the characteristics of a DSBAM wave, with a sampling frequency of one-half the sampling frequency taught in the prior art, thus the method of this invention uses a sampling frequency greater than the bandwidth of the modulated wave but less than twice that bandwidth.

Thus this invention makes use of a new, useful and nonobvious sampling theorem. In the reference cited above Black gives his tenth theorem on his pages 56 and 57, which states that the minimum sampling rate for a signal band extending between adjacent multiples of B, the bandwidth, is 2B or twice the bandwidth. Our invention uses what may be designated as an eleventh sampling theorem, not known to the prior art, which we state in Black's manner as follows:

THEOREM XI: When sampling a signal comprising a carrier with frequency fc double-sideband amplitude-modulated by a message, the minimum sampling rate fr for a signal bandwidth B where 2 fc is an integral multiple of fr, is B.

This result is seen to arise from the characteristics stated above for a DSBAM wave. We assume the sampling frequency to be related to the carrier frequency of the DSBAM so that the sampling instants are close to the instants of peak values of the modulated wave, as this will in general obviously result in less critical timing of the samples, and in an optimum signal-to-noise ratio. Then since the carrier frequency is known, or can be readily ascertained by commonly used methods at the receiving terminal, the sequence of sample amplitudes provides the only additional information required to fully define the modulated wave, that is the peak amplitude of the modulated wave at instants less than one-half the period of the highest message frequency. In this way the sequence of samples fully defines the envelope of the modulated wave. The sample period should be of the order of one-half a carrier period and the samples may be stretched by well known means to the period of the sampling frequency. Thus a band-pass filter which has a bandwidth which is greater than B (B is twice the highest message frequency), which is less than twice the sampling frequency and which is centered on the carrier frequency, integrates the sequence of samples into a wave which is substantially a replica of the DSBAM wave. Frequency and delay distortion due to the integrating filter can obviously be corrected by well-known equalization means. The filter and equalizer however introduce a non-removable delay, and the amplitude of the replica of the modulated wave is reduced due to the short sampling period and to the filter and equalizer loss.

When the integrating filter is a band-pass filter which has a bandwidth which is greater than B (B is twice the highest message frequency), which is less than twice the sampling frequency, and which is centered on an integral multiple of the sampling frequency other than the carrier frequency of the original DSBAM wave, then the filter integrates the sequence of samples into a DSBAM wave which has substantially the same envelope as the original DSBAM wave but which has a different carrier frequency.

When the integrating filter is a band-pass filter which has a bandwidth which is greater than B/2 (B/2 is the highest message frequency), which is less than the sampling frequency, and which extends either upwards or downwards in frequency from the vicinity of an integral multiple of the sampling frequency, then the filter integrates the sequence of samples into a single sideband which has substantially the same characteristics as the message.

When the integrating filter is a low-pass filter with a cut-off frequency above B/2 and below the sampling frequency, then the filter integrates the sequence of samples into a substantially accurate replica of the message.

FIG. 1 shows a schematic block diagram of a multiplex transmitter used in a multiplex system which is an embodiment of this invention. This system for simplicity has been limited to three channels. Each channel has a message source 1, 2 and 3 respectively. The messages may each be separate voice waves, may be three stereo channels of a single program, may be one-third the bandwidth of a voice channel frequency-shifted to the bottom third of the voice frequency range, or may be any of a number of other different waves. Each message source is assumed to occupy the same bandwidth B/2, although this is not a necessary limitation. Each of message sources 1, 2 and 3 modulates a carrier in double-sideband amplitude modulators 5, 6 and 7 respectively, and the outputs of modulators 5, 6 and 7 are combined in a linear combiner 8, such as a 4-winding transformer, and are modified by amplification, filtering with a band-pass filter of bandwidth B, frequency shifting, or otherwise as desired, in transmission circuits 9, and delivered over an output lead. Carrier source 4 supplies carrier directly to channel 1 modulator 5, through channel 2 b phase shifter 11 to channel 2 modulator 6, and through channel 3 phase shifter 12 to channel 3 modulator 7. Preferably the phase shifters are designed so that the carrier supplied to channel 2 modulator 6 is retarded from the channel 1 modulator carrier by about 120°, and the carrier supplied to channel 3 modulator 7 is retarded by about 240°, that is the three carriers are about equally spaced in phase.

The combined wave of all three channels at output lead 10 has a bandwidth of B, and this is the bandwidth of each channel separately. Preferably non-zero carrier amplitude is present at the output of combiner 8.

It is obvious that the basic arrangement of FIG. 1 can be extended to a different number of channels, for example two channels with carriers spaced more or less than 180°, 4 channels with carriers spaced about 90°, and so on. In any system no two channel carriers may be 180° apart.

Figure 2:
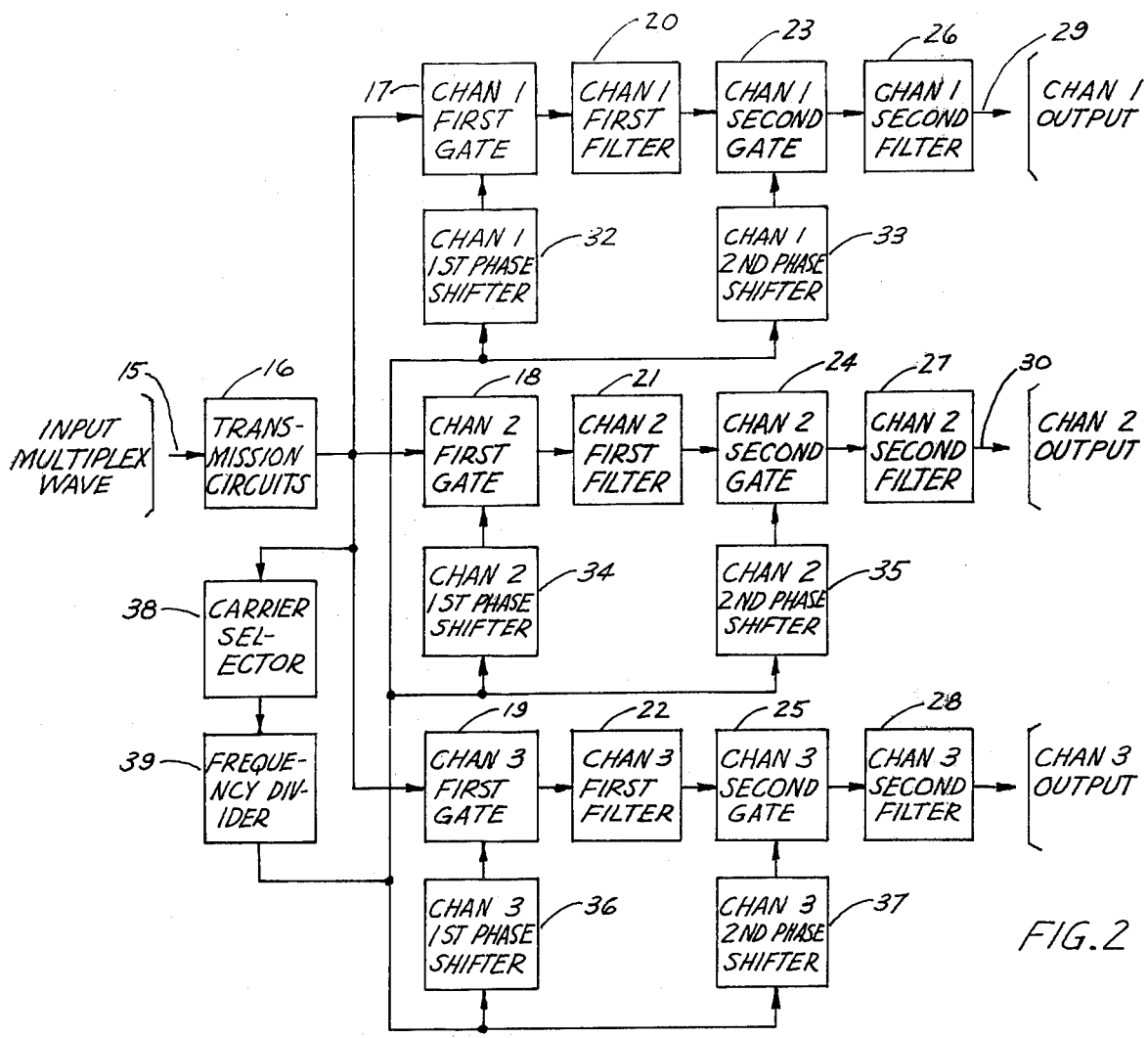

FIG. 2 shows a block schematic diagram for a multiplex receiving terminal, for use with the transmitting terminal of FIG. 1, which embodies this invention. The receiving terminal comprises an input lead 15 which receives the three-channel multiplex signal from the transmitting terminal of FIG. 1, and transmission circuits 16, which comprise the amplifying, filtering, frequency-shifting and other circuits necessary for modifying the received wave. The output of circuits 16 is delivered to a group of three first sampling gates, one for each channel, designated 17, 18 and 19 respectively. Each first gate is followed by one of a group of first band-pass filters, designated 20, 21 and 22 respectively, each having a bandwidth greater than B, and less than the sampling rate of the preceding gate, centered approximately on the carrier frequency of the wave at output of circuits 16, each of which filters integrates the sequence of samples from the preceding gate to form a substantially accurate replica of the two modulated waves containing two of the three input messages.

Each first filter is followed by one of a group of second gates designated 23, 24 and 25 respectively. Each second gate is followed by one of a group of second filters, designated 26, 27 and 28 respectively, having the same characteristics as filters 20, 21 and 22. Each of the second filters 26, 27 and 28 integrates the sequence of samples from the preceding second gate to form a substantially accurate replica of the modulated wave, containing only one of the three messages from the three message sources of FIG. 1, as determined by the phase shifts of the sampling frequency applied to the preceding first and second gates, and each second filter delivers a modulated carrier to one of a group of output leads designated 29, 30 and 31, following which the modulated wave may be demodulated to produce a substantially accurate replica of the message from the message source of that channel in FIG. 1.

The output of transmission circuits 16 is also delivered to carrier selector 38, which derives the carrier from the combined three-channel multiplex wave by well known selective and limiting methods. The derived carrier is passed to frequency divider 39, where it is divided down to a selected sampling frequency greater than B but less than 2B, by well known circuits, with the restriction that the sampling frequency is equal to twice the carrier frequency divided by an integer.

The sampling frequency passes channel 1 first phase shifter 32 and drives channel 1 first gate 17. Phase shifter 32 is designed so that gate 17 is open only at instants of zero crossings of the carrier of channel 2 at the input to gate 17. This is possible in general because the sampling frequency is derived from the carrier frequency. Thus the outputs of gate 17 and filter 20 contain only waves derived from message sources 1 and 3 of FIG. 1.

From phase shifter 32 the sampling frequency also passes through channel 1 second phase shifter 33 to channel 1 second gate 23. Phase shifter 33 is designed so that gate 23 is open only at zero crossings of the carrier of channel 3. As previously explained this is possible in practical cases because of the relationship of the carrier and sampling frequencies. Thus the outputs of gate 23 and filter 27 contain only waves derived from channel 1 message source 1 of FIG. 1.

In a similar manner channel 2 first phase shifter 34 is designed so that the outputs of channel 2 first gate 18 and filter 21 contain only waves derived from message sources 2 and 3 of FIG. 1. Channel 2 second phase shifter 35 is designed so that the outputs of channel 2 second gate 24 and filter 27 contain only waves derived from channel 2 message source 2 of FIG. 1.

Also in a similar manner channel 3 first phase shifter 36 is designed so that the outputs of channel 3 first gate 19 and filter 22 contain only waves derived from message sources 2 and 3 of FIG. 1. Channel 3 second phase shifter 37 is designed so that the outputs of channel 3 second gate 25 and filter 28 contain only waves derived from channel 3 message source 3 of FIG. 1.

It is obvious that if a transmitting terminal such as that of FIG. 1 has a number of message sources, other than three, then FIG. 2 may be readily modified accordingly. For example if FIG. 1 has two message sources, none of the channel 3 elements of FIG. 2 is required, and in addition the second phase shifters, second gates and second filters of channels 1 and 2 are not required. If a transmitting terminal such as FIG. 1 has 4 message sources, with associated phase shifters and modulators, then the receiving terminal is similar to FIG. 2, but also requires all the elements for a fourth channel. In addition, each channel requires a third phase shifter, a third gate and a third filter, so that three messages may be eliminated from each channel, leaving only the message proper to that channel.

In every case, the phase shifters of FIG. 1 must be designed so that no two channel carriers are 180° apart.

Figure 3:
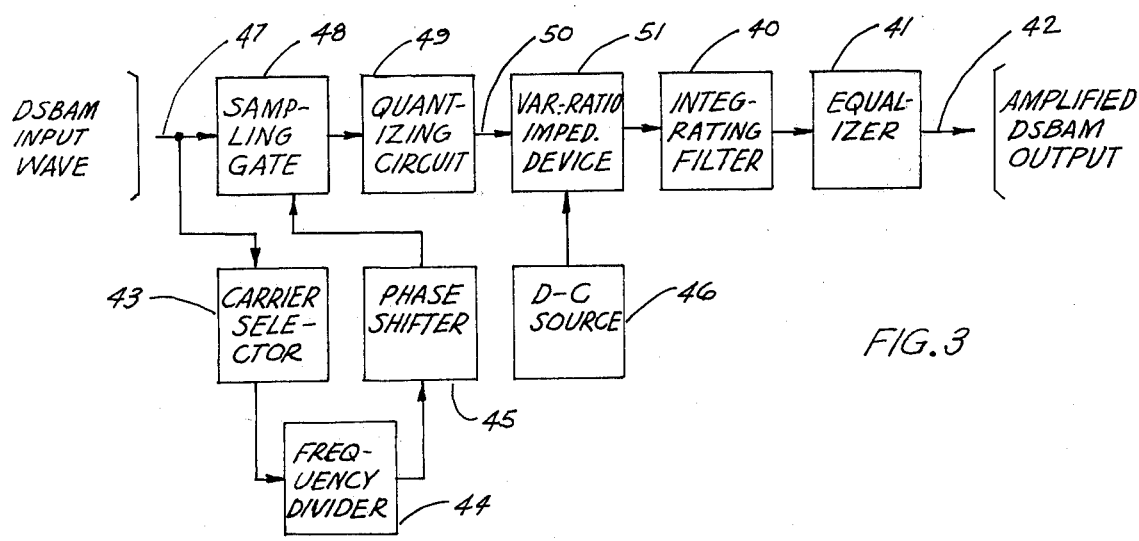

FIG. 3 shows a simplified block schematic of an amplifier which is an embodiment of this invention, for amplifying double-sideband amplitude-modulated waves. This amplifier functions by sampling the incoming DSBAM wave at a rate greater than, but less than twice its bandwidth. The samples are then quantized in a conventional quantizing circuit, and the coincidence of near-coincidence of each sample amplitude with one of the predetermined amplitudes of the quantizer, which are in a logarithmic series, energizes uniquely one or more of a plurality of leads connected from the quantizer to a variable-ratio impedance device, which draws power from a d-c source. This variable-ratio device delivers the power so drawn to an integrating band-pass filter which has a pass band adequate to pass the DSBAM wave, but not wide enough to pass the extraneous components due to the sampling frequency. From the filter the amplified wave then passes through an equalizer which corrects any frequency distortion due to the sampling process, the variable-ratio device and the filter.

In FIG. 3 a DSBAM input wave is delivered to lead 47, and then to sampling gate 48, which produces a sequence of samples of the DSBAM input wave, which are quantized in quantizing circuit 49, a well-known device, which has a plurality of output leads 50, a unique group for each quantized amplitude and at least one lead for denoting the polarity of the quantized sample amplitude, which leads connect quantizing circuit 49 to tap-selecting switching means which form part of variable-ratio impedance device 51. This device may comprise a transformer with two windings, each tapped in a logarithmic series, so that by switching a selected tap on a first winding to the d-c supply, switching a selected tap on a second winding to the load, a transformation ratio can be obtained equivalent to any amplitude in the series of logarithmic amplitudes in quantizing circuit 49. One or more selected leads in group 50 are also energized as necessary to establish the correct polarity of the pulse. Device 51 hence draws power from d-c source 46 and delivers pulses to integrating filter 40 which are substantially proportional in amplitude to the corresponding pulses from sampling gate 48. Integrating filter 40 is a band-pass filter which has a bandwidth adequate to pass the input wave at lead 47 but blocks unwanted frequencies due to sampling in gate 48. Filter 40 thus constructs a substantially accurate amplified replica of the input wave and delivers it to equalizer 41, which corrects for any frequency response variations due to the sampling process, device 51 and filter 40, and delivers an amplified replica of the input wave to a load.

Lead 47 also delivers the input DSBAM wave to carrier selector 43, where the carrier is derived by well known selective and limiting means, and is passed through frequency divider 44, where a sampling frequency is produced which is greater than B but less than 2B, and which is equal to twice the carrier frequency divided by an integer. These requirements on the sampling frequency can usually be met in practical cases. The sampling frequency passes through phase shifter 45, where it is shifted in phase so that it drives gate 48 open near instants of peak amplitude of the DSBAM wave at the input to gate 48. This is possible because of the relationship of the carrier and sampling frequencies.

We claim:

1. The method of processing a carrier double-sideband amplitude modulated by a message which comprises:
   sampling said modulated carrier at instants which occur at a frequency which is between twice and four times the highest frequency of said message, said instants not all occurring at zero crossings of said carrier, said sampling frequency being equal to twice the carrier frequency divided by an integer, to produce a sequence of samples, and
   integrating said sequence of samples in a filter to produce an output wave containing the information of the message.

2. The method of claim 1, in which some or all instants of said sampling occur at or near instants of peak values of said carrier.

3. The method of claim 1, in which all instants of said sampling occur at instants of zero crossings of an interfering carrier having the same frequency as, but a different phase from, said modulated carrier.

4. The method of claim 1, in which said instants of sampling have a duration not exceeding one period of said carrier.

5. The method of claim 1, in which said samples are stretched to a duration substantially equal to one sampling period.

6. The method of claim 1, in which said filter is a band-pass filter which has a pass band greater than the greatest bandwidth of said amplitude-modulated carrier and less than said sampling frequency, and is substantially centered on said carrier frequency.

7. The method of claim 1, in which said filter is a band-pass filter which has a pass band greater than the greatest bandwidth of said modulated carrier and less than said sampling frequency, and which is substantially centered on an integral multiple of said sampling frequency, other than said carrier frequency.

8. The method of claim 1, in which said filter is a band-pass filter which has a pass band greater than the highest frequency of said message but less than said sampling frequency, and which is located with one edge adjacent to an integral multiple of said sampling frequency.

9. The method of claim 1, in which said filter is a low-pass filter having a cut-off frequency greater than the highest frequency in said message.

* * * * *

UNITED STATES PATENT AND TRADEMARK OFFICE
CERTIFICATE OF CORRECTION

PATENT NO. : 4,178,553
DATED : December 11, 1979
INVENTOR(S) : Charles B. Fisher et al.

It is certified that error appears in the above-identified patent and that said Letters Patent are hereby corrected as shown below:

On the cover sheet, column 1, line 15, ""Reference Data for Radio Engineering", New York," should read -- "Reference Data for Radio Engineers", New York, --.

Column 5, line 22, "of near-coincidence of each sample amplitude with one" should read -- or near-coincidence of each sample amplitude with one --.

Signed and Sealed this

*Eighth* Day of *April 1980*

[SEAL]

*Attest:*

SIDNEY A. DIAMOND

*Attesting Officer*     *Commissioner of Patents and Trademarks*